United States Patent [19]

Lehmann et al.

[11] 4,091,517

[45] May 30, 1978

[54] HYDROSTATIC SUPPORT ARRANGEMENT

[75] Inventors: Helmuth Lehmann, Zurich; Rolf Lehmann, Rudolfstetten; Alfred Christ, Zurich, all of Switzerland

[73] Assignee: Escher Wyss Limited, Zurich, Switzerland

[21] Appl. No.: 798,983

[22] Filed: May 20, 1977

[30] Foreign Application Priority Data

June 23, 1976 Switzerland .......................... 8000/76

[51] Int. Cl.² ............................................. B21B 31/32
[52] U.S. Cl. ........................... 29/113 AD; 29/116 AD
[58] Field of Search .......... 29/113 AD, 116 AD, 110, 29/116 R, 113 R

[56] References Cited

U.S. PATENT DOCUMENTS

| 2,610,651 | 9/1952 | Hahn | 29/113 R X |
| 3,050,829 | 8/1962 | Appenzeller | 29/113 AD |
| 3,624,880 | 12/1971 | Justus et al. | 29/116 AD |
| 3,638,292 | 2/1972 | Gaghan | 29/113 AD |
| 3,802,044 | 4/1974 | Spillmann et al. | 29/116 AD X |
| 3,994,367 | 11/1976 | Christ | 29/116 AD X |

FOREIGN PATENT DOCUMENTS 447,472   8/1975   U.S.S.R. .......................... 29/113 AD

Primary Examiner—Alfred R. Guest
Attorney, Agent, or Firm—Werner W. Kleeman

[57] ABSTRACT

A hydrostatic support arrangement comprising a pressure chamber for a pressurized fluid medium, and a bearing surface which is pressed against a part to be borne or supported by the pressure of the pressurized fluid medium effective in the pressure chamber, which pressure bears against a support member. The pressure chamber and the bearing surface are constituted by a common section or profile member formed of an elastomeric material adapted to bear on the support member.

19 Claims, 14 Drawing Figures

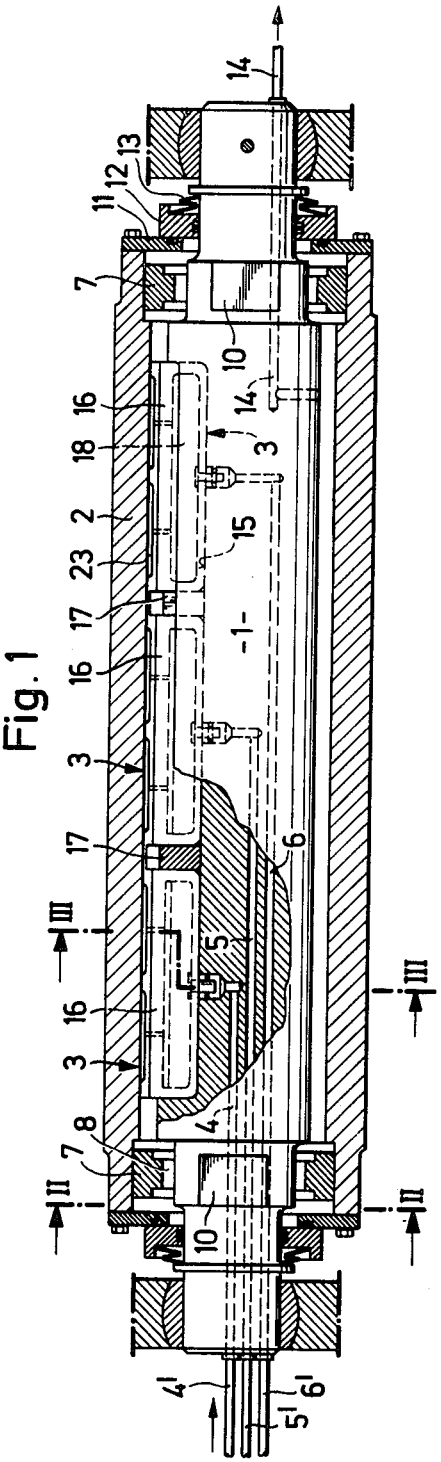
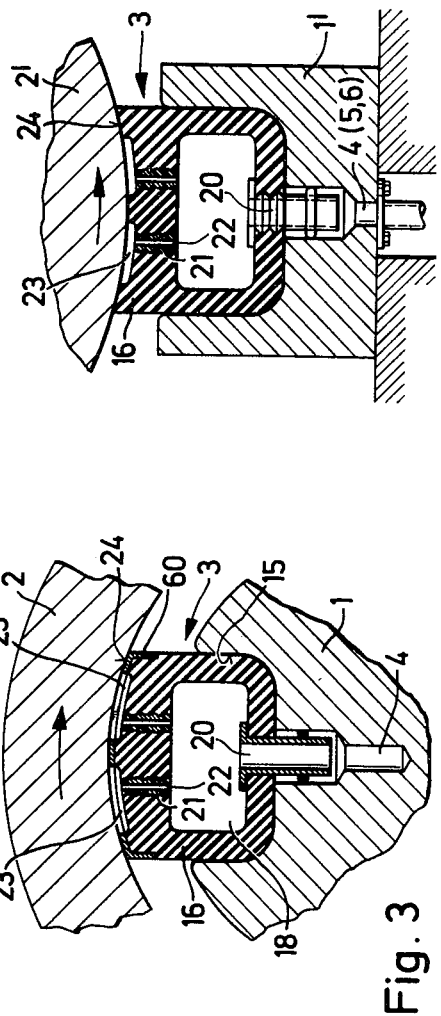
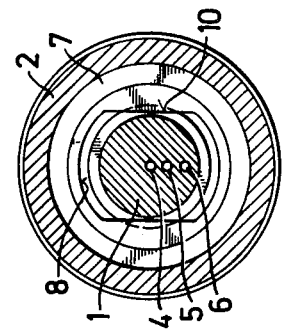

HYDROSTATIC SUPPORT ARRANGEMENT

BACKGROUND OF THE INVENTION

The present invention relates to a new and improved construction of a hydrostatic support arrangement or device which is of the type comprising a pressure chamber for a pressurized fluid medium and a bearing surface which is pressed against a part to be borne or supported by the pressure of the pressurized fluid medium which is effective in the pressure chamber, this pressure in turn bearing against a support member.

A hydrostatic support arrangement of this type is known, for instance, from U.S. Pat. No. 3,119,324 or British Pat. No. 611,466, the disclosure of which is incorporated herein by reference. In these prior art constructions the pressure chamber is formed in a cylinder within which there is guided a piston. The piston is provided with a bearing pad or the like upon which there is formed the bearing surface. In both cases the support device or arrangement is secured to a stationary support member around which there can rotate a hollow tubular roll shell or barrel. The roll shell is hydrostatically supported by a number of support devices, so that the shape of the roll shell remains uneffected by the support member sagging under load. Rolls of this type are used, for example, in papermaking machinery and for textile processes and are typically known in the art as flexure adjusting or controlled deflection rolls. With such type rolls, upon rotation of the roll shell about the support member, there is formed a hydrodynamic film of lubricant from an oil bath in the roll shell between the bearing surfaces of the support devices and the inside surface of the roll shell. A drawback of such state-of-the-art constructions is that they are mechanically fairly complex.

Furthermore, in U.S. Pat. No. 3,802,044 and German patent publication No. 2,230,139, there is disclosed another support device or support arrangement for a controlled deflection roll wherein the bearing surface is formed on a punch or prop-like member which is guided for pivoting and axial movement relative to the support member. The bearing surface is equipped with at least one bearing pocket for the hydrostatic mounting of the member or part to be borne or supported by the support device, such member in this case being constituted by the roll shell. The bearing pocket or pockets communicate by means of throttle bores or restrictor passages with the cylinder chamber of the support device. This construction enables a hydrostatic lubricant film to form between the bearing surface and the supported member, i.e. the roll shell.

This heretofore known construction has proved to be very satisfactory and affords many advantages, for instance, a large stroke of the punch or prop-like member, so that in many instances it is possible to avoid the use of external contact or pressing mechanisms, which otherwise are required in the case of controlled deflection rolls. Yet, this conventional construction is too elaborate for many simple applications.

SUMMARY OF THE INVENTION

With the foregoing in mind, it is a primary object of the present invention to provide a further development of the prior art support devices or arrangements and, specifically, to devise a support device or arrangement which is much simpler and cheaper than the heretofore known support devices and which is equally suitable for use in conjunction with controlled deflection rolls and for other purposes, for example, for the construction of hydrostatic bearings.

Still a further object of the present invention aims at the provision of a new and improved construction of hydrostatic support arrangement which is relatively simple in design, economical to manufacture, highly reliable in operation, requires a minimum of maintenance and servicing, is not readily subject to breakdown or malfunction, and has an extended field of application.

Now in order to implement these and still further objects of the invention, which will become more readily apparent as the description proceeds, the support arrangement or device of this development is manifested by the features that the pressure chamber and the bearing surface are formed on a common section or profile member composed of an elastomeric material adapted to bear on the support member.

Due to these measures there is attained the necessary mobility of the bearing surface relative to the support member solely by virtue of the resilience of the elastomeric material. The metallic pistons or punches or equivalent structure, which have to be accurately machined, since they are equipped with sliding surfaces for guiding them on the cylinder surfaces can be omitted along with the necessary gaskets and seals.

As basically already known from U.S. Pat. No. 3,802,044, the pressure chamber can flow communicate by way of throttle channels or restrictor passages with at least one bearing pocket which is formed in the bearing surface and serves for the hydrostatic mounting of a part or member to be supported or borne by the support device. The advantages of the present invention therefore can be combined with the advantages of a hydrostatic mounting between the sliding or friction surface and the member to be borne or supported. For instance, a controlled deflection roll having such support devices can be produced much more simply and cheaply than the prior art rolls, yet essentially retains all of the properties thereof.

The section or profile member may possess a substantially rectangularly cross-section extending in a direction essentially perpendicular to the bearing surface and is adapted to be introduced into a groove in the support member. In this way it is possible to produce in a very simple manner elongated support sources which can be arranged in groove-like recesses in or on the support member.

Alternatively, it is within the teachings of the invention to devise the section member such that it is of round cross-section and can be adapted to be introduced into a cylindrical recess in the support member. Just as was the case for the conventional support devices, such recess can be in the form of a bore or passage which can be produced with great accuracy through the aid of very simple means.

Preferably, the throttle channels or restrictor passages connecting the pressure chamber with the bearing pockets can be formed in metallic throttle or restrictor members embedded in the elastomeric material. This feature makes it a simple matter to produce the throttle channels or passages to the required accuracy.

The profile or section member can have a cross-section which is open at the distal side from the bearing pockets, i.e. at a location removed from the bearing pockets so that the pressure chamber flow communicates directly with a recess in the support member. This recess is intended for the reception of the profile or section member. Consequently, there is obtained an extremely simple constructional embodiment. The profile or section member is devoid of a closed internal space and therefore can be easily fabricated. Additionally, there are not needed the connecting elements which are conventionally required for connecting the hollow interior or space of the section member to a connecting line in the support. The profile or section member simply can be introduced into its recess, and the requisite sealing action between the profile or section member and the recess is established as a result of the hydraulic pressure of the pressurized or pressure medium.

Another possibility for constructing the profile or section member is for the same to have two bearing surfaces at two oppositely disposed locations, bearing pockets being formed in the bearing surfaces, and the pressure chamber being located between the bearing surfaces. This embodiment of support device or arrangement is especially suitable for use with controlled deflection rolls as disclosed, for instance, in U.S. Pat. No. 3,919,753 and German Pat. No. 2,359,423, the disclosure of which is incorporated herein by reference. Still another possibility would be for the profile or section member to have at least two pressure chambers which can be connected to various pressure lines. With this construction it is then possible, for instance in the case of a controlled deflection roll or a hydrostatic bearing, to select different pressures in the peripheral direction or in the direction of movement of the mounted member. Such construction can be provided only with difficulty, if at all, for the prior art support device disclosed in the aforementioned U.S. Pat. No. 3,802,044.

Just as is the case for the prior art support device disclosed in U.S. Pat. No. 3,802,044, the support device or arrangement of the present invention likewise can be provided on its bearing surface with at least three bearing pockets whose centers are disposed on two different straight lines. Consequently, and as explained in the just mentioned United States patent, there is realized a stabilization of the bearing surface on the supported or borne member, for instance the roll shell of a controlled deflection roll.

It is also possible to construct the bearing surface at a flat part or member formed of a rigid material which is sealingly connected with the elastomeric material. Such type construction, which is relatively complex because it may require machining of the rigid material, is suitable for relatively high hydraulic pressures.

However, it is also possible to imbed a reinforcement or reinforcing member formed of a rigid material in the elastomeric material of the section or profile member near the bearing surface. In this way there is realized a construction which is relatively easy to produce and which has a rigid running surface, since such running surface need not be formed at the rigid material but at the elastomeric material.

In both instances, the rigid material may be a metal or a ceramic material.

When the profile or section member possesses a substantially round cross-section, it can have imbedded therein a reinforcement extending in the peripheral direction and serving to prevent radial elongation of the profile or section member. A profile member reinforced in this way can work with higher hydraulic pressures and therefore also with higher contact or pressing forces than a non-reinforced profile or section member.

However, the profile or section member also can be enclosed by a substantially ring-shaped or annular bearing or support member which prevents radial elongation of the profile member. This arrangement provides substantially the same effect as in the case of a reinforced profile or section member, but utilizes simpler means.

As already mentioned, the support device or arrangement of the invention can be preferably used for supporting the roll shell of a controlled deflection roll. However, its field of use is not limited to this application, quite to the contrary it can be used in other environments, such as for the hydrostatic mounting of shafts or drums and similar members.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal section view through a controlled deflection roll of the type disclosed in U.S. Pat. No. 3,802,044 and equipped with a hydrostatic support device or arrangement constructed according to the present invention;

FIG. 2 is a cross-sectional view taken substantially along the line II—II of FIG. 1;

FIG. 3 is a cross-sectional view taken substantially along the line III—III of FIG. 1;

FIG. 4 is a sectional view through an embodiment of the support device or arrangement as shown in FIGS. 1–3, but used for the mounting of a shaft or a drum;

FIG. 11 is a sectional view through an embodiment of support device which also is additionally equipped with a pressing or contact cushion or the like;

DETAILED DESCRIPTION OF THE PREFERRED EMBODIMENTS

Figure 5:
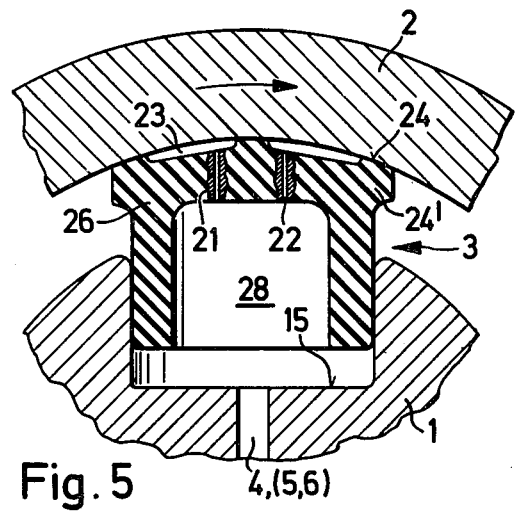
FIG. 5 is a sectional view through a support device or arrangement wherein the profile or section member thereof is open on the lower side distal from the bearing pockets.

Describing now the drawings, FIG. 1 constitutes a longitudinal sectional view of a controlled deflection roll representing a further development of the roll disclosed in U.S. Pat. No. 3,802,044, the disclosure of which is incorporated herein by reference. The roll comprises a stationary support member 1 around which there can rotate a roll shell 2. This roll shell 2 is borne or supported on the hydrostatic support devices 3 which presses such roll shell against, for instance, a conventional back-up roll which has not been particularly shown. The hydrostatic support devices 3 will be described in greater detail hereinafter and flow communicate by way of the bores or passages 4, 5 and 6 connected to lines or conduits 4′, 5′ and 6′ respectively, with not particularly illustrated suitable sources of a hydraulic pressure or pressurized fluid medium.

As best seen by referring to FIGS. 1 and 2, guide disks 7 formed with elongated apertures or openings 8 are disposed at the ends of the roll shell 2. These guide disks 7 are rotatably mounted in the ends of the roll shell 2 and are guided by means of their apertures or openings 8 along flat or planar surfaces 10 provided at the support member 1. The guide disks 7 therefore serve to guide the roll shell 2 in its movement relative to the support member 1 in the plane of the direction of the force exerted by the support devices 3. This system is known from both U.S. Pat. No. 3,855,283 and Austrian Pat. No. 320,423, to which reference may be readily had and the disclosures of which are incorporated herein by reference.

Additionally, closure disks 11 and 12 are disposed at the ends of the roll shell 2, the disks 12 being pressed against the disks 11 by spring wahers or plate springs 13 or equivalent structure. These disks 11, 12 prevent escape of the hydraulic liquid out of the roll shell 2 to the outside. Liquid is removed from the gap or space between the roll shell 2 and the support member 1 by means of a discharge line or conduit 14 which can be connected, for instance, to a not particularly illustrated pump.

The construction of the various support devices 3 will be apparent by referring for instance to FIG. 3. The support member 1 will be seen to be formed with an elongated groove or channel 15 receiving the profile or section members 16 formed of an elastomeric material. According to the illustration of FIG. 1, three such profile or section members 16 are received in a single common groove 15 and spacers 17 are arranged therebetween. Each profile or section member 16 is provided with a pressure chamber 18 from which a nipple or stud 20 extends to the exterior and is connected to the corresponding pressure line 4 or 5 or 6.

Furthermore, throttle or restrictor members 21 equipped with the throttle channels or restrictor passages 22 extend outwards from the pressure chamber 18 to the bearing pockets 23. The throttle members 21 are imbedded, e.g. by vulcanization, in the elastomeric material of the profile or section member 16 which can be formed, for instance, of rubber. The bearing pockets 23 are disposed in a bearing surface 24 which is formed on the profile member 16 and by means of which the same bears against the roll shell 2.

During operation, there is delivered in the same manner as for the support devices disclosed in the aforementioned U.S. Pat. No. 3,802,044, a pressurized or pressure liquid to the pressure lines or conduits 4, 5, and 6. Depending upon requirements, the pressure prevailing in the lines can be the same for each such pressure line or can be different. The hydraulic pressure liquid flows from the pressure lines into the pressure chamber 18 of the associated support device 3. The pressure in the pressure chamber 18 presses the bearing surface 24 against the inside surface of the roll shell 2, with the bearing surface 24 being capable of moving towards or away from the roll shell 2 owing to the deformation of the elastomeric material of the profile or section member 16.

At the same time the hydraulic liquid also flows from the pressure chamber 18 through the throttle channels 22 into the bearing pockets 23. FIGS. 1 and 3 illustrate that each support device 3 has four bearing pockets 23. A back-pressure builds up therein and disengages the bearing surface 24 from the inside surface of the roll shell 2. When, as illustrated in FIG. 3, the hydraulically effective size of the bearing surface 24 is greater than the hydraulically effective size of the pressure chamber 18, then, there is realized an equilibrium condition such that there exists a constant, stable gap between the surface 24 and the roll shell 2. The provision of four bearing pockets 23 also stabilizes the bearing surface 24 on the inside surface of the roll shell 2. This effect has been described in greater detail in the aforementioned U.S. Pat. No. 3,802,044.

The support device 3 illustrated in FIG. 4 corresponds to the support device 3 shown in FIGS. 1 and 3, with the sole difference that the support device 3 of FIG. 4 is secured in a block 1′ and serves for the mounting of a shaft or a drum, generally indicated by reference character 2′. Hence, the support device 3 thus forms a hydrostatic outside bearing.

FIG. 5 illustrates a hydrostatic support device 3 which also may be beneficially used in a roll having a support member 1 and a roll shell 2. The support device 3 of FIG. 5 comprises a profile or section member 26 whose pressure chamber 28 is open on the side distal from the bearing or operative surface 24. The pressure chamber 28 therefore is in direct flow communication with the groove or recess 15 and thus with the corresponding line or passage 4, or 5, or 6. The profile or section member 26 is considerably simplified by the omission of the closure wall and the nipple.

In operation, the pressure in the pressure chamber 28 presses the elastomeric material of the profile or section member 26 againt the wall of the recess 15, to thereby produce a sealing-type closure. Also, and as was the case for the previously described embodiment, the upper or top part 24′ of the section member 26, and which part forms a type of bearing pad or the like with the bearing surface 24, is pressed against the inside surface of the roll shell 2.

Figure 6:
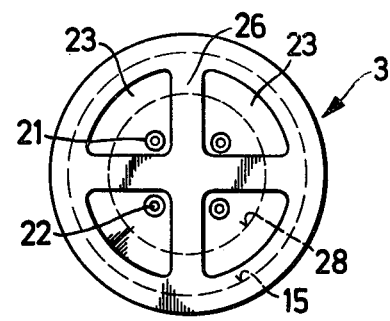
FIG. 6 is a plan view of the embodiment shown in FIG. 5.

As already explained, the recess 15 can be formed as an elongated groove or channel similar to FIG. 1. However, the recess 15 also can be in the form of a cylindrical bore or passage. In this case, the profile or section member 16 of FIG. 3 will possess the substantially round or circular shape shown in FIG. 6. Also in this case, there are provided four bearing pockets 23 which flow communicate by means of the throttle or restrictor members 21 with the pressure chamber 28.

Figure 7:
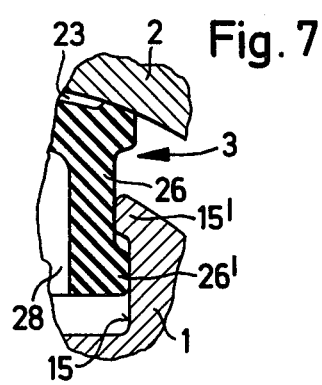
FIG. 7 is a partial sectional view through a modified form of the support device shown in FIG. 5.

FIG. 7 illustrates part of the arrangement of FIG. 5 in a somewhat modified version. In the embodiment of FIG. 7 the profile or section member 26 is provided at its bottom end with an annular or ringshaped external bead 26′ and the recess 15 has an inwardly directed bead 15′. These beads 15′ and 26′, or equivalent structure, serve to secure the section member 26 in the recess 15 following assembly, and furthermore, during operation, they limit the upward travel or movement of the section member 26 within the recess 15. Once the two beads 15′ and 26′ have abutted against one another, further movement of the bearing surface 24 towards the roll shell 2 is possible only as a result of deformation of the profile or section member 26.

Figure 8:
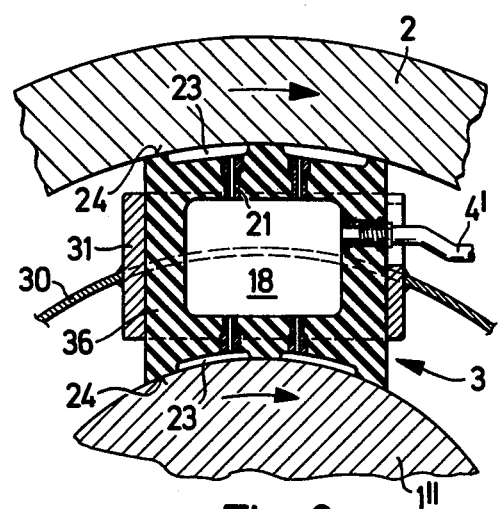
FIG. 8 illustrates a support device for use in a roll of the type disclosed in U.S. Pat. No. 3,919,573.

The embodiment illustrated in FIG. 8 is intended, by way of example, for use with a roll having a rotatable support member as disclosed in U.S. Pat. No. 3,919,753, the disclosure of which is incorporated herein by reference. In this case the roll has a support member 1" which is rotatable together with the roll shell 2. Disposed between the roll shell 2 and the support member 1" is a stationary holder 30 equipped with tubular or elongated retaining members 31 for one or more support devices 3.

In this instance, the support device 3 is provided with a profile or section member 36 having on two opposite sides the bearing surfaces 24 where there are provided the bearing pockets 23. Hydraulic fluid medium is supplied to the pressure chamber 18 via a line or conduit 4' which, in the embodiment under discussion, is disposed outside of the support member 1" on the holder 30.

The operation of the support device 3 shown in FIG. 8 is basically the same as in the previous embodiment, but gaps with lubricant film are formed on two sides, and specifically, on the one hand, between the section member 36 and the roll shell 2, and, on the other hand, between the section member 36 and the support member 1".

Figure 9:
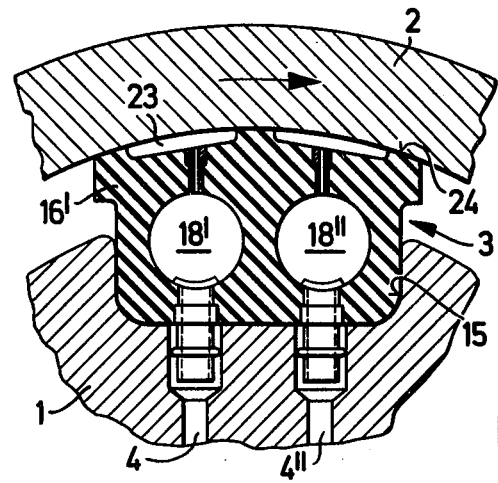
FIG. 9 is a sectional view through a support device equipped with two separate pressure chambers.

The embodiment shown in FIG. 9 differs from the embodiment shown in FIG. 3 only inasmuch as a section member 16' is here provided with two pressure chambers 18' and 18" connected to separate pressure lines 4 and 4". By using different pressures in the chambers 18' and 18" it is possible to separately control at both sides the size of the gap between the operative or bearing surface 24 and the roll shell 2.

Figure 10:
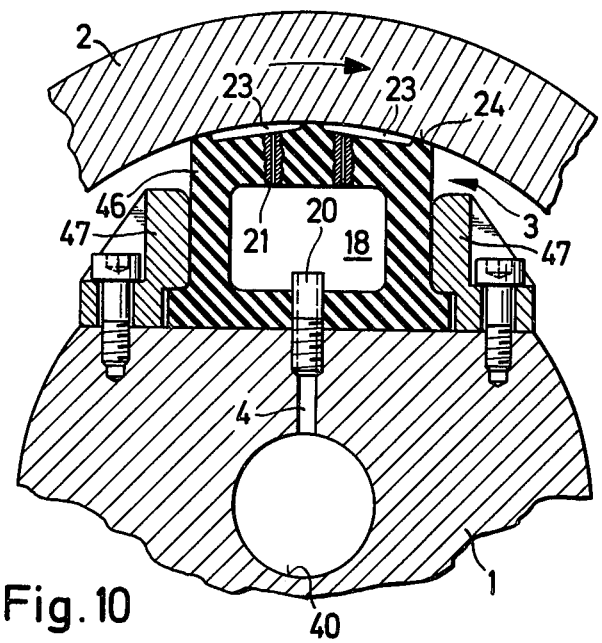
FIG. 10 is a sectional view through another embodiment of support device or arrangement according to the invention.

With the embodiment shown in FIG. 10, a profile or section member 46 is not inserted into a groove provided in the support member or carrier 1, rather is secured between two lateral retaining members 47 cooperating with one another to bound a space corresponding to the groove or channel 15. In other respects the mode of operation of the support device 3 of the arrangement of FIG. 10 and its construction is the same as that discussed previously with regard to the embodiment of FIG. 3.

Figure 11:
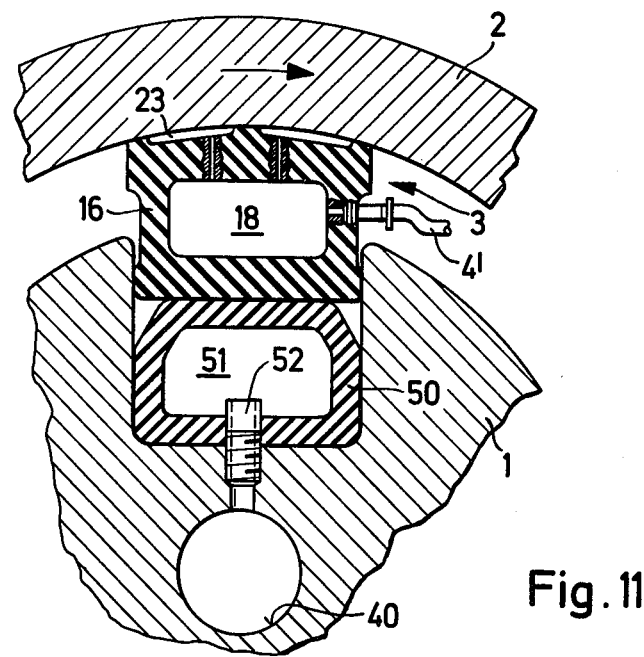

FIG. 11 illustrates an embodiment of support device 3 comprising, apart from the profile or section member 16, a pressing or contact member 50 which likewise is in the form of a profile or section member composed of a rubber-elastic or elastomeric material. The section member 16 is connected with a hydrauic line or conduit 4'. The pressing member 50, which is formed with a hollow space or compartment 51, flow communicates by means of a nipple or stud 52 with a line or conduit 40. During operation and depending upon requirements, the lines 4' and 40 can be separated from one another or joined together, i.e. they can be at the same or different pressures and can work with the same or different hydraulic media. In certain circumstances, the pressure medium which is effective in the hollow compartment or chamber 51 — and which need not possess lubricating properties — can be a gas which imparts elasticity or resiliency to the support device 3 during operations. The most important advantage of the embodiment of FIG. 10 is that it allows for relatively large operative movements or strokes, that is to say, movements of the support device 3, between the support member 1 and the roll shell 2.

As also will be apparent from the showing of FIG. 3, the bearing surface 24 of the profile or section member 16 is formed on a flat member 60 composed of a rigid material sealingly connected with the elastomeric material of the section member 16. The rigid material of the member 60 can be preferably a metal.

The use of the member 60 renders the support device 3 of FIG. 3 suitable for operation at relatively high pressures. The member 60 permits movement of the member 16 together with the roll shell 2 away from and back towards the support member 1, but limits lateral expansion of the member 16 by the hydraulic pressure in the pressure chamber 18.

Figure 12:
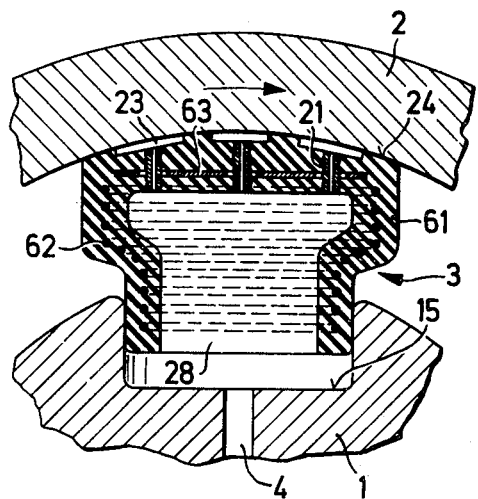
FIG. 12 is a sectional view through a support device having a reinforced profile or section member.

The main difference between a section member 61 of a support device 3 as shown in FIG. 12 and the section member 26 shown in FIG. 3 resides in the fact that the section member 61 is equipped with a reinforcement or reinforcing member 62 for adaptation to relatively high pressures in the pressure chamber 28 and therefore in order to form relatively high restraining or support forces. As illustrated, the reinforcement 62 can be in the form of peripherally extending annular or ring-shaped wires imbedded in the elastomeric material of the profile or section member 61. The reinforcement 62 of course can consist of textile filaments and, for instance, be wound in coils or possibly arranged in a number of layers. What is only of importance is that the reinforcement 62, regardless of its nature or structure, should protect the section member 61 in the peripheral direction against radial expansion or extension while permitting axial deformation of the member 61 towards the roll shell 2.

Furthermore, the profile or section member 61 of FIG. 12 is equipped with a reinforcing member or reinforcement 63 below its bearing surface 24. This reinforcement 63, which can be in the form of a plane metal plate, is imbedded in the elastomeric material of the member 61 and serves to strengthen that part thereof which forms the bearing surface 24.

The reinforcement 63 has the same affect as the member 60 of the embodiment of FIG. 3; however, the bearing surface 24 is not formed in the rigid e.g. metallic material but in the elastomeric material of the section member. In certain instances this feature may facilitate production of the profile or section member.

Figure 13:
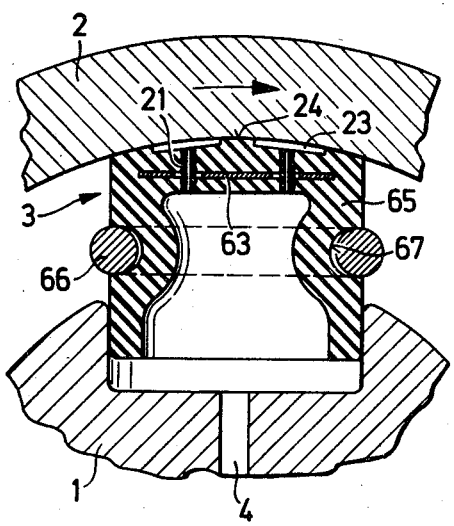
FIG. 13 is a sectional view through a support device or arrangement in which the section member is equipped with external reinforcement.

In the case of a profile or section member 65 as shown in FIG. 13, the reinforcement or reinforcing member 62 is replaced by an annular support member 66 received in a groove 67 provided at the periphery of the section member 65. The support member 66 functions basically in the same manner as the reinforcement 62. A strengthening or reinforcement member 63 is here also provided below the bearing surface 24 for this embodiment.

Figure 14:
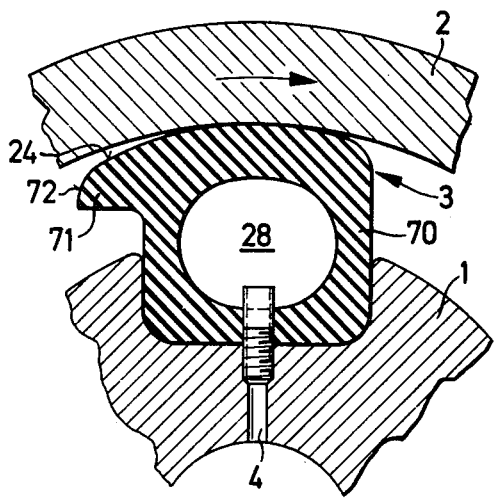
FIG. 14 is a sectional view through a support device provided with hydrodynamic lubrication.

The section member 70 of the support device 3 shown in FIG. 14 differs from all of the prior discussed embodiments in that here there does not exist a hydrostatic support or mounting of the roll shell 2 at the bearing surface 24, rather there is accomplished a hydrodynamic mounting of the roll shell 2 at such bearing surface 24. Therefore, the bearing pockets 23 and the throttle members 21 are omitted. Instead, the profile or section member 70 is provided at least at its side directed opposite the direction of rotation of the roll shell 2 with a projection or protuberance 71 having a rounded portion 72. Consequently, during operation there occurs the depicted deformation of the bearing surface 24 which favors the formation of a hydrostatic lubricant wedge.

Of course, the principle of hydrodynamic mounting of the roll shell on the bearing surface 24 can be used in all of the previous embodiments of the support devices.

All that is needed for this purpose is to omit the bearing pockets 23 and the throttle members and, where necessary, to provide lateral rounded portions like the rounded portion 72.

While there are shown and described present preferred embodiments of the invention, it is to be distinctly understood that the invention is not limited thereto, but may be otherwise variously embodied and practiced within the scope of the following claims.

What we claim is:

1. A hydrostatic support device for supporting a movable part, comprising:
   a hydraulic pressure chamber;
   means for applying hydraulic pressure to the pressure chamber;
   a bearing surface cooperating with the hydraulic pressure chamber and bearing against the movable part to be supported under the action of the hydraulic pressure in the pressure chamber;
   a support member against which there is applied the pressure of the pressurized fluid medium;
   said pressure chamber and said bearing surface comprising a common integral section member formed of an elastomeric material adapted to bear the support member; and
   said common integral elastomeric section member when subjected to the hydraulic pressure being urged towards the movable part to be supported and taking up further loads applied to the common integral section member by deformation of the elastomeric material.

2. A hydrostatic support device as defined in claim 1, further including:
   at least one bearing pocket provided for said bearing surface;
   throttle means for flow communicating the pressure chamber with said at least one bearing pocket; said bearing pocket serving for the hydrostatic mounting of said part to be supported by the support device.

3. The hydrostatic support device as defined in claim 2, wherein:
   said throttle means comprise throttle channels connecting the pressure chamber with the bearing pockets and formed in metallic throttle members imbedded in the elastomeric material.

4. The hydrostatic support device as defined in claim 2, wherein:
   said bearing surface has at least two bearing pockets whose centers are disposed on two different straight lines.

5. The hydrostatic support device as defined in claim 1, wherein:
   said section member possesses a substantially rectangular cross-sectional configuration in a direction extending substantially perpendicular to said bearing surface;
   said support member being provided with a groove;
   said section member being inserted into said groove of the support member.

6. The hydrostatic support device as defined in claim 1, wherein:
   said section member possesses a substantially circular cross-sectional configuration;
   said support member being provided with a substantially cylindrical recess for received the circular section member.

7. The hydrostatic support device as defined in claim 6, further including:
   peripherally extending reinforcement means imbedded in said section member for preventing radial elongation thereof.

8. The hydrostatic support device as defined in claim 6, further including:
   a substantially annular bearing member dispositioned around the section member for preventing radial elongation of said section member.

9. The hydrostatic support device as defined in claim 1, wherein:
   said support member has a recess for receiving the section member;
   said section member possessing a cross-section which is open on the distal side from the bearing surface, so that the pressure chamber directly communicates with said recess of the support member.

10. The hydrostatic support device as defined in claim 1, wherein:
    said section member is provided with bearing surfaces at two oppositely disposed locations;
    said pressure chamber being located between said bearing surfaces.

11. The hydrostatic support device as defined in claim 1, wherein:
    said section member is provided with at least two of said pressure chambers;
    a respective pressure line with which each said pressure chamber is operatively connected.

12. The hydrostatic support device as defined in claim 1, wherein:
    said bearing surface comprises a flat member formed of a rigid material and sealingly connected to the elastomeric material of the section member.

13. The hydrostatic support device as defined in claim 12, wherein:
    said rigid material is a metal.

14. The hydrostatic support device as defined in claim 12, wherein:
    said rigid material is a ceramic material.

15. The hydrostatic bearing device as defined in claim 1, further including:
    a reinforcing member formed of a rigid material and imbedded in the elastomeric material of the section member at a location near said bearing surface.

16. The hydrostatic support device as defined in claim 15, wherein:
    said rigid material is a metal.

17. The hydrostatic support device as defined in claim 15, wherein:
    said rigid material is a ceramic material.

18. The hydrostatic support device as defined in claim 1, wherein:
    said support device constitutes part of a controlled deflection roll.

19. The hydrostatic support device as defined in claim 1, wherein:
    said hydraulic pressure chamber is essentially totally enclosed within said common integral elastomeric section member.

* * * * *